United States Patent
Seiler et al.

(10) Patent No.: US 7,807,289 B2
(45) Date of Patent: Oct. 5, 2010

(54) BATTERY PACK AND BATTERY MODULE AND METHOD FOR OPERATING A BATTERY MODULE

(75) Inventors: Hartmut Seiler, Reutlingen (DE); Philipp Kohlrausch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 11/939,893

(22) Filed: Nov. 14, 2007

(65) Prior Publication Data

US 2008/0152993 A1 Jun. 26, 2008

(30) Foreign Application Priority Data

Dec. 22, 2006 (DE) ......................... 10 2006 061 270

(51) Int. Cl.
*H01M 2/24* (2006.01)
(52) U.S. Cl. ..................... 429/160; 429/92; 429/158
(58) Field of Classification Search .................. 429/92
See application file for complete search history.

(56) References Cited

U.S. PATENT DOCUMENTS

| | | | |
|---|---|---|---|
| 3,992,225 A | | 11/1976 | Sykes |
| 5,736,271 A | * | 4/1998 | Cisar et al. ..................... 429/96 |
| 2002/0022178 A1 | * | 2/2002 | Asaka et al. .................. 429/158 |
| 2003/0026063 A1 | * | 2/2003 | Munshi ....................... 361/503 |
| 2005/0110458 A1 | | 5/2005 | Seman, Jr. et al. |
| 2006/0019155 A1 | | 1/2006 | Seman, Jr. et al. |
| 2006/0026822 A1 | | 2/2006 | Seman, Jr. et al. |
| 2006/0119317 A1 | | 6/2006 | Kogan et al. |

FOREIGN PATENT DOCUMENTS

| | | |
|---|---|---|
| GB | 2 408 396 | 5/2005 |
| GB | 2408396 | * 5/2005 |

\* cited by examiner

*Primary Examiner*—Dah-Wei D Yuan
*Assistant Examiner*—Patricia Davis
(74) *Attorney, Agent, or Firm*—Michael J. Striker

(57) ABSTRACT

A battery pack with at least two electrochemical cells, lithium ion cells in particular, has each cell including a positive pole and a negative pole on the end face of the particular cell body, the poles of the cells being electrically connected in series and/or in parallel. A cell connector for electrically connecting the cells is provided on at least two cells, on the end face on the same side relative to their position in the battery pack, the cell connector connecting one pole of the connected cells and extending to a contact region of a circuit board; the cell bodies of the cells are positioned parallel to each other, and the end faces of the cell bodies are located in the same plane.

13 Claims, 4 Drawing Sheets

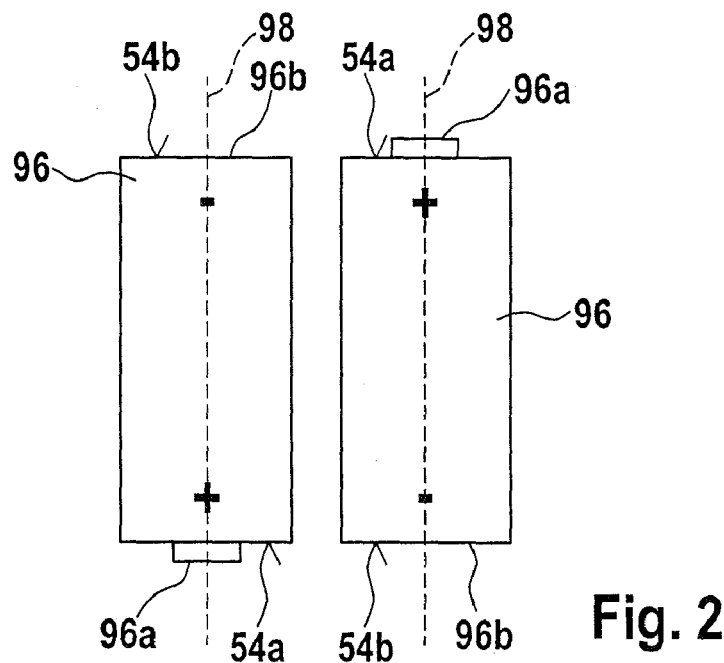
Fig. 2
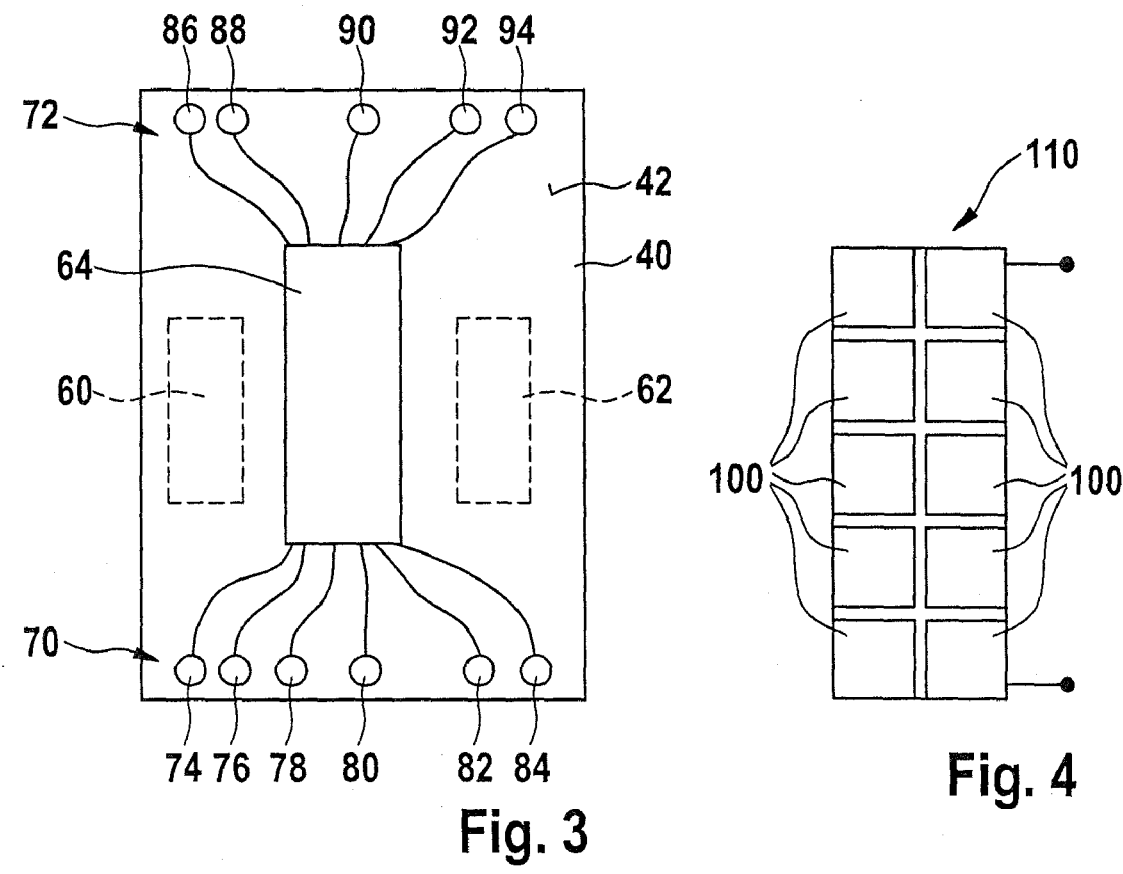
Fig. 3
Fig. 4

BATTERY PACK AND BATTERY MODULE AND METHOD FOR OPERATING A BATTERY MODULE

CROSS-REFERENCE TO A RELATED APPLICATION

The invention described and claimed hereinbelow is also described in German Patent Application DE 102006061270.1 filed on Dec. 22, 2006. This German Patent Application, whose subject matter is incorporated here by reference, provides the basis for a claim of priority of invention under 35 U.S.C. 119(a)-(d).

BACKGROUND OF THE INVENTION

The present invention is directed to a battery pack and a battery module, and a method for operating a battery module.

It is known that the service life of lithium ion secondary battery cells is affected by excessive discharging and by overcharging. To prevent damage, these battery cells should be charged to a maximum voltage in the range of 4.0 to 4.5 V, and they should not fall below a voltage of 1.0 to 2.5 V.

If several cells are connected in a series connection to form a "battery pack", it is not sufficient to monitor the voltage of the entire pack. Due to production-related scatterings of capacitance and parasitic discharge resistances, the cells are in various states of charge, which continue to drift apart from each other over the course of time, due to the charge/discharge cycles. An inhomogenous temperature distribution that occurs in the pack during operation also causes the battery voltages to drift. During charging, the cells in a pack therefore do not reach their end-of-charge voltage at the same time. This can result in individual cells becoming overcharged and, therefore, damaged. Conversely, when the pack is discharged, there is a risk that, when the end-of-discharge voltage of the pack is reached, individual cells will discharge below their permissible end-of-discharge voltage and become damaged. This can even go so far that, when the pack is discharged, the polarity of the cell is changed and the cell is destroyed, thereby rendering the entire pack unusable. Since asymmetries in the cells are amplified by the charge/discharge cycles, the case of the polarity of individual cells being changed occurs after a number of charge/discharge cycles that cannot be estimated in advance, resulting in the failure of the pack.

To prevent the service life of a battery pack from being shortened, it has already been proposed to monitor the cells in a pack individually. In this process, the voltage of each cell is monitored and, when a lower or upper limit is reached, the particular cell is bridged with compensation electronics. This can be accomplished using various suitable circuits. In any case, however, it is necessary for the positive and negative poles of each cell to be guided out of the pack.

Compensation electronics for cells in a pack are made known, e.g., in patent application GB 2408396 A. In that case, the connections of the cells are guided out via separated lines to the compensation electronics. These compensation electronics are located separate from the pack, which results in high fabrication costs, since the process of connecting the pack and the electronics is not automatable, and must be carried out manually. With mass-produced products such as battery packs in power tools, or planned series-production products such as hybrid vehicles, manual fabrication steps of this type are undesired, for reasons of time and costs.

Furthermore, it is problematic that cables may break or contacts may become detached when mechanical loads are applied that typically occur with power tools. Cable breaks or detached contacts may result in failure of the compensation electronics and premature failure of the battery pack, since it may no longer be properly monitored or charged.

SUMMARY OF THE INVENTION

The present invention is directed to a battery pack with at least two electrochemical cells, lithium ion cells in particular, with each cell including a positive pole and a negative pole on the end face of the particular cell body, the poles of the cells being electrically connected in series and/or in parallel.

It is provided that a cell connector for electrically connecting the cells is provided on at least two cells, on the end face on the same side relative to their position in the battery pack, the cell connector connecting one pole of the connected cells and extending to a contact region of a circuit board. The cell bodies of the cells are positioned parallel to each other, and the end faces of the cell bodies are located in the same plane. The cell connectors may be contacted directly with the circuit board. As a result, a defined—for fabrication purposes—geometric assignment of the ends of the cell connectors to the circuit board side and of the position of the circuit board is made possible, thereby enabling and simplifying an automated fabrication process. This makes it possible to shorten cycle times in the fabrication of battery packs.

The fact that the cell bodies of the cells are located parallel to each other results in a compact design. The cells are preferably located electrically antiparallel. This results in a particularly space-saving design for connecting the cell connectors. The cells are preferably longitudinal in design, with a circular or quadrangular cross section in particular. The compact design is further supported by the fact that the end faces of the cell bodies lie in the same plane.

The cell connectors on a top side of the battery pack, for example, may then be located in a plane that is parallel to a plane on the underside of the battery pack in which those cell connectors are located. This simple geometry also makes it easier to connect the battery pack. After the cell connectors are connected with the contacts on the circuit board side, they may be connected with the end faces of the cells on the underside and on the top side of the battery pack. The circuit board with installed components and with the cell connectors may be connected with the battery pack, e.g., they may be combined to form one main body. The cell connectors may then be welded together with the cells on their end faces.

The battery pack is preferably one cell in length, i.e., every cell is connected with cell connectors at both of its end faces. In principle, two or more cells may also be connected one behind the other in the battery pack along their cell bodies, and they may then connected with cell connectors on the two outer ends of the two or more cells. In this case, the cells would be monitored, e.g., in pairs.

The cell connectors may be manufactured preferably as punched rids and connected with the circuit board in the same method step in which referred electronic elements such as throttle elements, temperature monitors, ell voltage monitors, and the like are installed on the circuit board. The preferred punched grip includes connections that guide each pole on the particular side of the battery pack to the circuit board, on which the compensation electronics are located. It may therefore be ensured that every pole of every cell is assigned to an electrical terminal pad on the circuit board.

The voltage of individual cells may be monitored easily by suitably combining two circuit board terminal pads. The cell connectors, which enable the cells to be electrically interconnected in the typical manner, are advantageously designed, e.g., via a contact tag, such that they simultaneously form a lead to the contact region of the circuit board and make it possible to tap potential in order to monitor the voltage of the individual cells at the circuit board. To this end, typical cell connectors may be easily modified accordingly by providing extensions and contact tags. Cell connectors are often manufactured via punching, thereby enabling the modification of the cell connectors to be realized easily.

For compact battery packs, of the type used, e.g., with power tools and hybrid vehicles in particular, it is advantageous when the compensation electronics are connected directly and closely with the pack, and when the simplest, most "fabrication friendly" wiring is provided. Cabling may be reduced substantially by using the inventive design. This shortens cycle times, reduces fabrication costs, and prevents cabling errors.

Particularly advantageously, the cell connectors, which are located on the same side relative to the cells, may be located in a plane. The fabrication steps of assigning the cell connectors and the poles of the cells in a defined manner, and of connecting the cell connectors to the cells are therefore simplified.

When every cell connector guides a positive pole of a cell and a negative pole of an adjacent cell to the contact region, a particularly simple assignment of contact pairs in the contact regions on the underside and the top side of the battery pack is made possible, in order to determine a cell voltage of a defined cell.

Advantageously, the cells may be packed tightly together, thereby resulting in a particularly compact design.

It is favorable when the cells are embedded in a battery bed. The battery bed may be designed as a temperature compensation element, e.g., a metallic body, or it may be composed of a plastic mass with good thermal conductivity, which may also be filled, e.g., with metallic particles, or it may be composed of a material or have a material embedded in it that has a phase transition that is below the maximum permissible working temperature, with the latent heat of which the temperature of the pack may be held constant for a certain period of time. The temperature compensation element ensures that temperature is homogeneous throughout the battery pack, which also ensures that operating conditions remain homogeneous. The battery bed may also serve as a heat sink for dissipating heat away from the battery pack.

Advantageously, the battery bed may be thermally connected to a temperature sensor on the circuit board. Given that the battery pack is packed tightly together in the inventive design, the circuit board and cells may be particularly close together, thereby enabling direct physical contact between the temperature sensor, e.g., a temperature-sensitive integrated circuit, and the battery bed. Due to the homogenization of temperature brought about by the battery bed, the cell temperature in the battery pack may be monitored with sufficient accuracy. An external temperature sensor that would have to be installed on the battery pack is not required. Instead, this space may be integrated, in a space-saving manner, directly on the circuit board, e.g., in an ASIC. The effect of the electronics located directly on the battery pack, which protects the cells, prevents overheating and compensates cell voltage, thereby extending the service life of a battery pack.

In a particularly compact design, the circuit board may be positioned parallel to a longitudinal extension of the cell body. This is particularly favorable when the battery pack is to be used in a power tool, in which the installation space available for battery packs is typically extremely limited.

Advantageously, the circuit board may include compensation electronics for the symmetrization of the state of charge of the cells. In this case, the cell temperature may be monitored during operation, charging and discharging processes may be carried out in a cell-protecting manner, and overheating may be avoided. The electronics—except for a few non-integrable power components, such as power resistors, coils, capacitors, and, optionally, power circuit breakers—may be integrated in an ASIC (Application-Specific Integrated Circuit). Advantageously, the ASIC may include a temperature sensor for detecting the temperature of the battery pack, preferably the temperature of the cell in the battery pack with the highest thermal load. To this end, the ASIC may be connected via a thermally good connection with the main body, or, if one is not available, with the cell with the highest thermal load. In addition to the compensation electronics for compensating the cell voltages, the circuit board and/or the ASIC may also preferably include electronics for charging the battery pack. To charge the battery pack, advantageously only one mains voltage supplied from an external source is then required. This makes it possible, e.g., to work with a battery-operated power tool as if it were an electrical power tool. This is advantageous when it is not always necessary to operate in a cordless manner.

The continual recharging of the battery pack made possible as a result enables continual operation without stopping to recharge and, if desired or required, work may continue in a cordless manner. A further advantage of the close proximity of the circuit board—with the compensation electronics installed—and the charging electronics to the battery pack is that the battery pack may be non-detachably connected with a portable power tool, thereby eliminating the risk of the battery pack accidentally becoming detached and falling out. The permanent connection between the battery pack and the power tool makes economic sense because the compensation electronics result in a substantial extension of the service life of the battery pack.

Preferably, the number of cells in the battery pack may be chosen such that the corresponding electronic elements, such as throttles, power resistors, current limiting circuit, and compensation electronics, may be built using low-voltage components, which are much less expensive than high-voltage components. When the electronics are integrated in an ASIC in particular, a standard process may be used, which results in cost-optimized manufacturing of the ASIC.

Advantageously, the circuit board may include electronics for monitoring the voltage of the cells, and/or the circuit board may include compensation electronics for the symmetrization of the state of the cells, and a circuit for charging the cells with the aid of an external mains voltage.

According to a further aspect of the present invention, a battery module may be constructed that contains a plurality of battery packs with preferred cell connectors, which are electrically connected in series and/or in parallel. The connection of similar battery packs makes it possible to utilize high output voltages, e.g., of several hundred volts, as is required in hybrid vehicles, battery-operated vehicles, or in emergency-power systems. The actual cell compensation electronics of every battery pack may still be constructed using low-voltage components. Every battery pack may be one cell long. It is also feasible, however, to position at least two cells one behind the other.

The modular design of a high-voltage battery module also makes it possible to replace individual defective battery packs without having to replace the entire battery module when one cell becomes defective. With the aid of the compensation electronics, it is possible to diagnose the individual cells of a battery pack and to locate a battery pack in the battery module. According to a preferred method, to diagnose, e.g., a particular drift of the individual cell voltages of a battery pack, charge/discharge cycles may be compared with each other and, if a limiting value is exceeded, a signal may be generated that prompts the user to replace the related battery pack.

A preferred use of the inventive battery module in hybrid vehicles makes it possible to recharge the battery pack—in an effective and non-destructive manner—at a mains outlet or, e.g., at solar cell-operated recharging stations at parking lots, company parking lots in particular. Since most vehicles are operated for short periods of time and remain in the same location for a long time before use, it is possible and practical to recharge the battery module, in particular with advantageously stationary solar panels, thereby reducing the fuel consumption of the hybrid vehicle considerably.

A power tool with a battery pack, which is fixedly connected with the power tool, is also preferable.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a schematic depiction of a pair of cells that are electrically oriented in the antiparallel direction;

FIG. 3 shows a top view of a schematically depicted, preferred circuit board of a preferred battery pack; and FIG. 4 is a schematic depiction of a preferred battery module with a plurality of preferred battery packs.

DESCRIPTION OF THE PREFERRED EMBODIMENTS

Figure 1A:
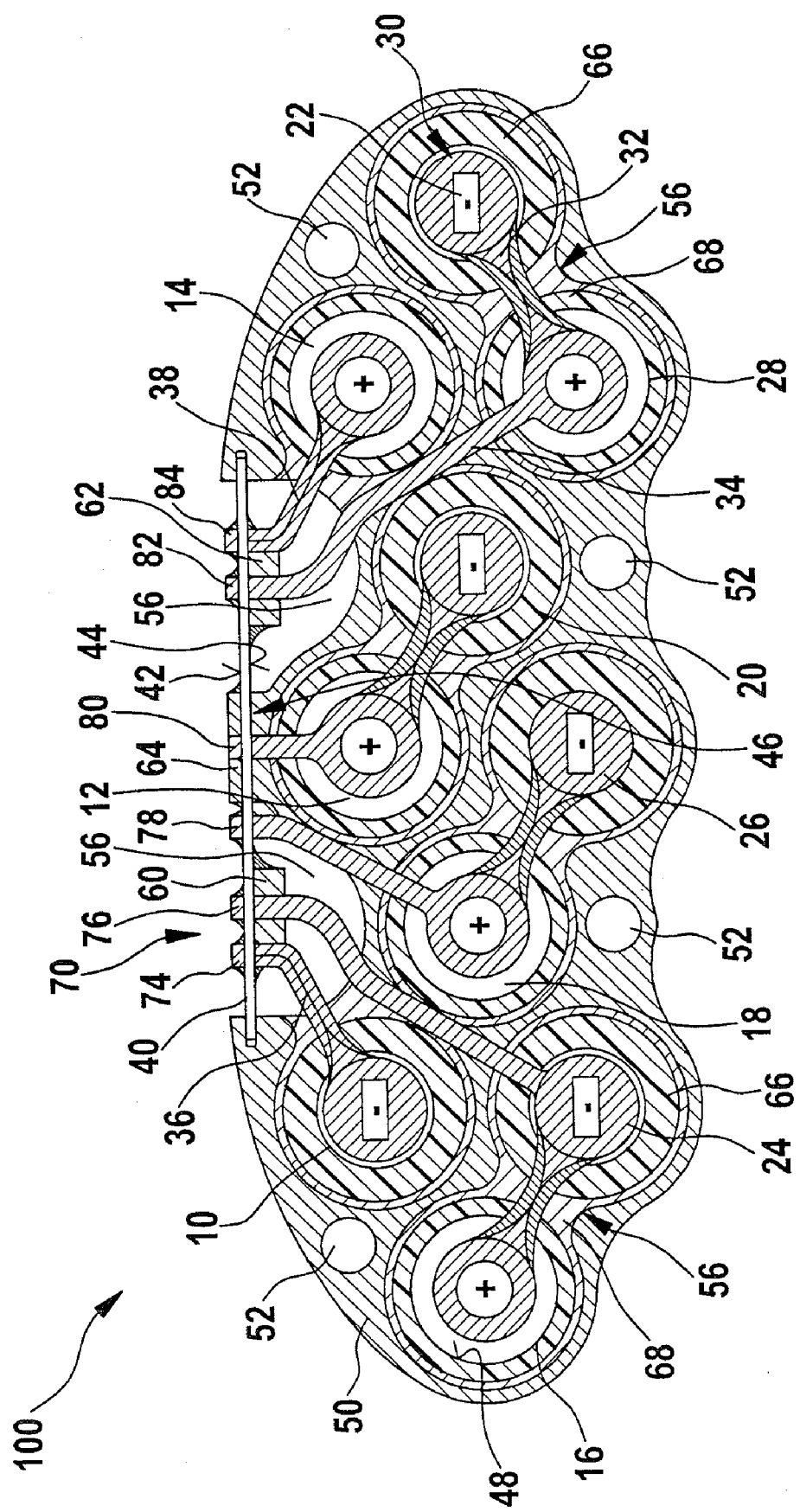
FIGS. 1a, b show a top view of a top side (FIG. 1a) and an underside of a preferred battery pack (FIG. 1b)
Figure 1B:
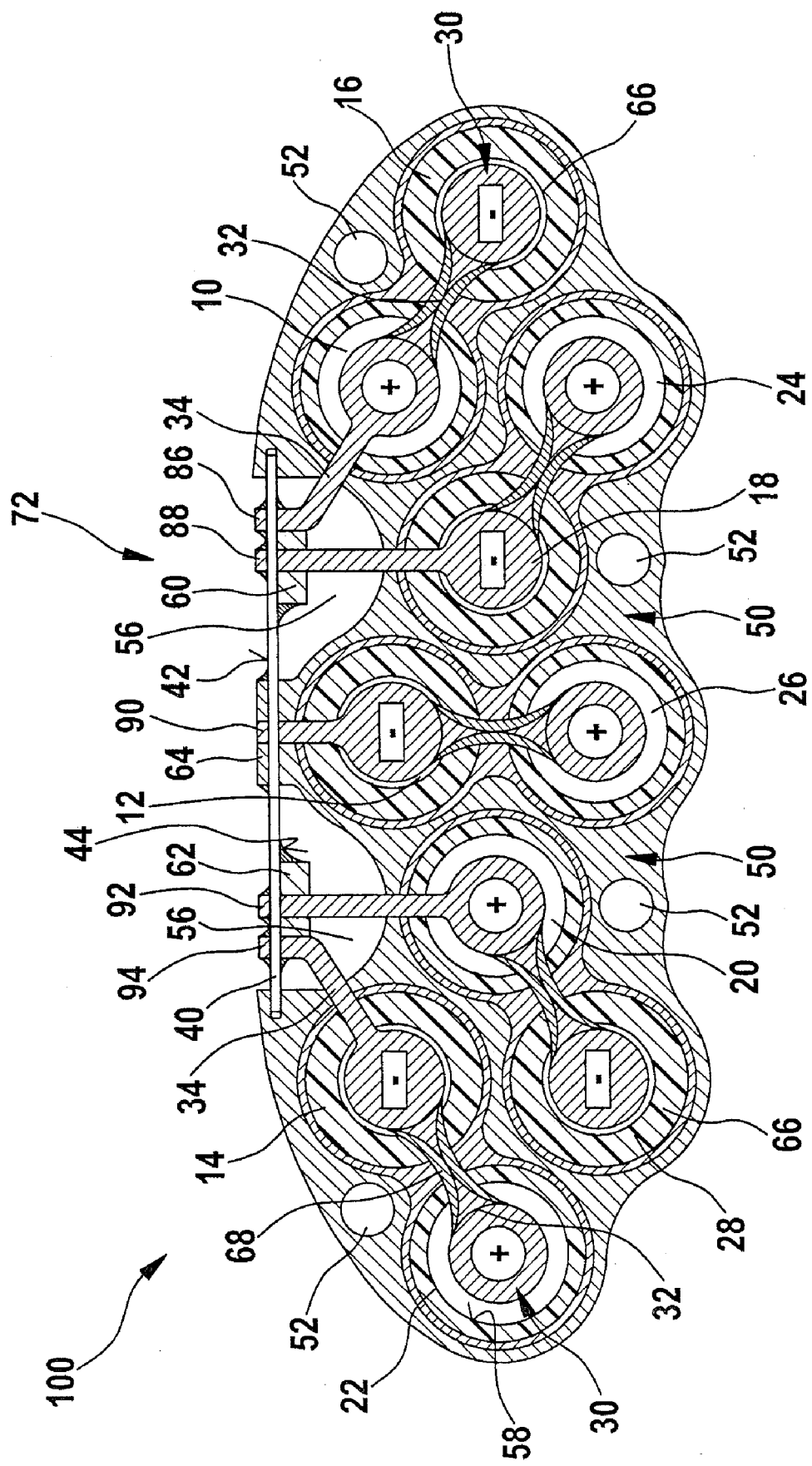

Components that are the same or similar are labelled with the same reference numerals in the figures. FIGS. 1a and 1b explain the present invention with reference to a top view of a top side (FIG. 1a) and an underside (FIG. 1b) of a preferred battery pack 100. Battery pack 100 includes, e.g., ten cylindrical cells 10, ..., 28, in a hexagonal configuration, which enables cells 10, ..., 28 to be packed as tightly as possible. Depending on the need, more or fewer cells may be provided, and the cells may be positioned in any configuration required.

Cells 10, ..., 28 preferably have the same design and are oriented antiparallel relative to each other, as depicted schematically in FIG. 3 based on two cells; the antiparallel orientation is not labeled separately. As a result, a longitudinal extension 98 of one cell body 96 is oriented parallel to longitudinal extension 98 of adjacent cell body 96. Electrical positive pole 96a of one cell 96 points toward the same side as electrical negative pole 96b of adjacent cell 96, and vice versa. Poles 96a, 96b are formed on end faces 54a, 54b of cells 96.

With reference to FIGS. 1a and 1b, cells 10, ..., 28 shown are inserted in receptacles—which will not be described in greater detail—of a battery bed 50 in the antiparallel configuration shown in FIG. 3. Positive and negative poles of cells 10, ..., 28 are not labeled separately. Battery bed 50 is preferably designed as a temperature compensation element and a heat sink, so that the temperature in battery bed 50 is homogenized, and the heat dissipated from cells 10, ..., 28 may be simultaneously dissipated outwardly. The lowest possible temperature gradient in battery pack 100 is desired with lithium ion cells in particular. A few holes 52, which enable battery pack 100 to be attached, are also provided in battery bed 50. Battery bed 50 may be a metallic body or a plastic with good thermal conductivity, e.g., a plastic mass filled with metal. Instead of the plastic mass, a material may be used or a material may be embedded in the plastic mass that has a phase transition that is below the maximum permissible working temperature of the battery pack, the latent heat of which the temperature of the pack may be held constant for a certain period of time.

Cells 10, ..., 28 are cast in receptacles with a casting compound 68, which retains cells 10, ..., 28 and serves to improve the thermal coupling of cells 10, ..., 28 to battery bed 50. Only a few of the regions with casting compound 68 are labeled with reference numerals, for clarity. Casting compound 68 is also advantageously designed with good thermal conductivity. Cells 10, ..., 28 are provided with an electrical insulation 66 on their exteriors, which extends to the end faces of cells 10, ..., 28 and extends over the edge of the particular cell body. The end faces of cells 10, ..., 28 practically lie in a plane 48 or 58 on the top side or underside of battery pack 100. Insulation 66 is preferably made of a shrink film that contracts when heated and encloses the cell body tightly.

Due to the hexagonal configuration of cells 10, ..., 28, the first three cells 10, 12, 14 are located in the top row, four cells 16, 18, 20, 22 are in the middle row, and three cells 24, 26, 28 are in the bottom row of the configuration. Sets of two cells 10, ..., 28 are connected by a single cell connector 30, which is labeled in general with reference numeral 30. Only a few of the cell connectors 30 are labeled, for clarity. Cell connector 30 includes a connector end 32, which interconnects two of the cells 10, ..., 28, e.g., cell 16 and cell 24, and leads into a trailing segment 34, which extends to circuit board 40 and is connected therewith. Trailing segment 34 is preferably designed as a plug contact, and extends, e.g., through circuit board 40 and is soldered or welded thereto.

Every cell connector 30 connects the positive pole of one of the cells 10, ..., 28 with the negative pole of one of the adjacent cells 10, ..., 28. Cell connectors 30 are preferably designed as punched grids, are therefore flat, and are relatively rigid in accordance with the thickness of sheet metal used. As a result, they practically lie in a plane 48 and 58 on the top side or underside of battery pack 100. Cell 10 and cell 14 are connected on the top side (plane 48) of battery pack 100 with a separate contact tab 36 and 38 to contact regions 70 and 72 of circuit board 40 on the front side and underside of battery pack 100, without their being connected with another cell 12, 16, ..., 28 on the top side. Contact tabs 36, 38 also lie in plane 48 with cell connectors 30 on the top side, and in plane 58 on the underside of battery pack 100.

Circuit board 40 is coupled directly with battery bed 50 and extends parallel to cells 10, ..., 28. On its back side 44, circuit board 40 includes electronic elements 60 and 62, which extend into cavities 56 of battery pack 100. Compensation electronics 64 are also located on front side 42 of circuit board 40, which are designed to compensate the different cell voltages and prevent overcharging and deep discharging of cells 10, ..., 28. Compensation electronics 64 are preferably thermally coupled via a thermal contact 46 to battery bed 50, therefore enabling it to sense the temperature of battery bed 50.

A top view of circuit board 40 in FIG. 3 schematically depicts the design of the circuit board with its contact regions 70, 72 on the opposing ends of circuit board 40. Electrical terminal pads 74, 76, 78, 80, 82 and 84 are located in contact region 70; electrical terminal pads 86, 88, 90, 92 and 94 are located in contact region 72. A cell connector 30 with two poles of two cells 10, ..., 28 is connected to each of these terminal pads 76, 78, 80, 82, 84, 86, 88, 90, 92, while only one pole is connected via a contact tab 36 and 38 to contacts 74 and 84, i.e., the negative pole of cell 10 to terminal pad 74 and the positive pole of cell 14 to terminal pad 84. In the configuration shown, the cells are electrically connected in series, from cell 10 to cell 28.

As shown in FIG. 1a, the summation voltage of all cells 10, . . . , 28 of entire battery pack 100 may therefore be tapped at contacts 74 and 84. The cell voltage of every individual cell 10, . . . , 28 may be determined between suitable pairs of terminal pads 74, . . . , 94 as follows. The cell voltage of cell 10 may be tapped between terminal pads 74 and 86. The cell voltage of cell 12 may be tapped between terminal pads 80 and 90. The cell voltage of cell 14 may be tapped between terminal pads 84 and 94. The cell voltage of cell 16 may be tapped between terminal pads 76 and 86. The cell voltage of cell 18 may be tapped between terminal pads 78 and 88. The cell voltage of cell 20 may be tapped between terminal pads 80 and 92. The cell voltage of cell 22 may be tapped between terminal pads 82 and 94. The cell voltage of cell 24 may be tapped between terminal pads 76 and 88. The cell voltage of cell 26 may be tapped between terminal pads 78 and 90. The cell voltage of cell 28 may be tapped between terminal pads 82 and 92.

A preferred battery module 110 with a plurality of battery packs 100 is depicted schematically in FIG. 4. Ten battery packs 100 are provided in the example shown. In a series connection, the ten-fold output voltage of an individual battery pack 100 may therefore be tapped at two poles, which are not described in greater detail. In a preferred method of operating battery module 110, compensation electronics 64 make it possible to diagnose the individual cells—which are not described in greater detail here—of a battery pack 100, and to locate a battery pack 100 in battery module 110. To perform a diagnosis, e.g., a particular drift of the individual cell voltages of a battery pack 100 after charge/discharge cycles may be compared with each other. When a limiting value is exceeded, a signal is generated, which prompts the user to replace particular battery pack 100.

Figure 5:
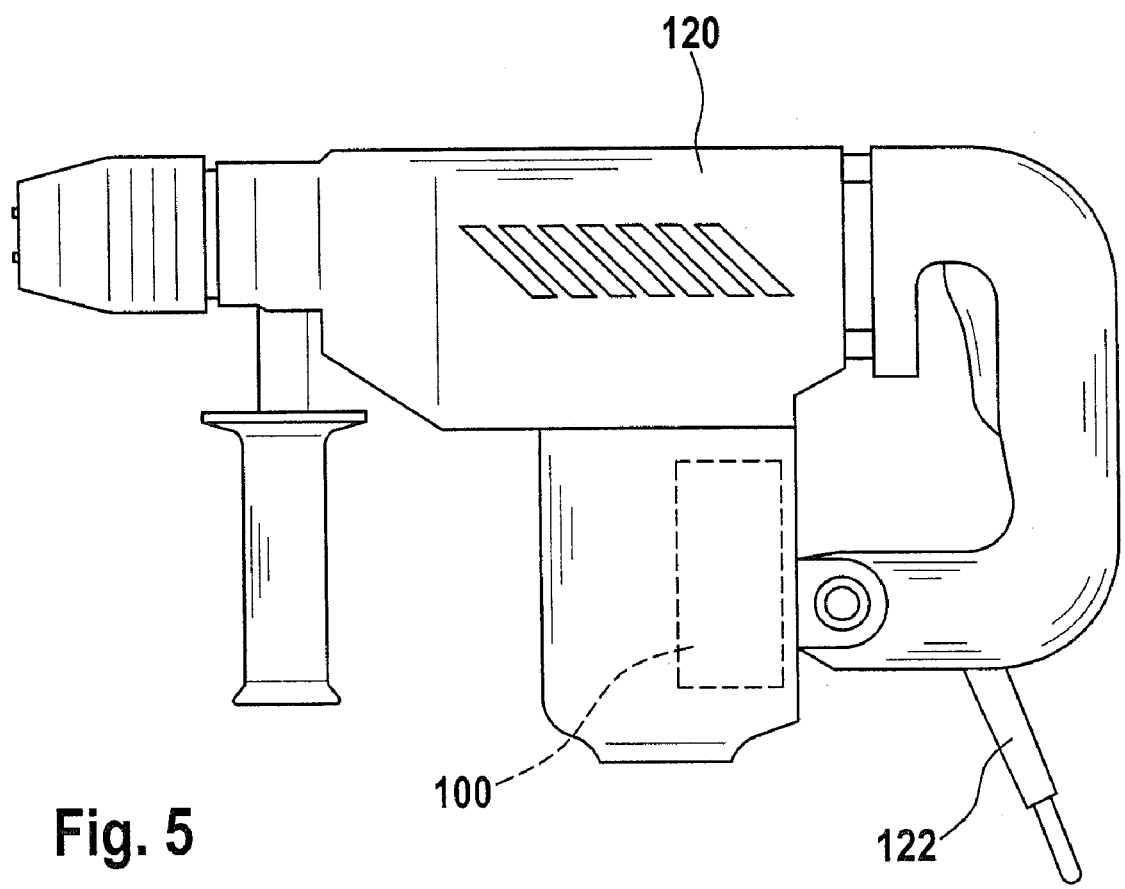
FIG. 5 shows a preferred power tool with a fixedly installed battery pack.

FIG. 5 is a schematic illustration of a portable, preferred power tool 120, in which a battery pack 100 has been fixedly installed. Battery pack 100 preferably includes electronics that are preferably located on its circuit board 40, contain compensation electronics 64 (FIGS. 1a, 1b) to compensate the cell voltages, and that preferably include electronics for charging battery pack 100. An externally supplied mains voltage may be used to charge battery pack 100, therefore making it possible to use a battery-operated power tool as an electrical power tool and enabling continual operation without stopping to recharge. Work may be performed with a mains connection 120 or battery pack 100. Due to this extended service life of battery pack 100, which may be attained according to the present invention, battery pack 100 may be non-detachably connected with the power tool, thereby eliminating the risk of battery pack 100 accidentally becoming detached and falling out.

It will be understood that each of the elements described above, or two or more together, may also find a useful application in other types of constructions differing from the type described above.

While the invention has been illustrated and described as embodied in a battery pack and battery module and method for operating a battery module, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A battery pack, comprising:
   at least two electrochemical cells each including a positive pole and a negative pole on an end face of a cell body, said poles of said cells being electrically connected with one another in a manner selected from the group consisting of in series, in parallel and both;
   a cell connector for electrically connecting said cells and provided on at least two cells, on an end face on a same side relative to their position in the battery pack, said cell connector including a connector end for connecting one pole of the connected cells and further including a trailing end extending to and connecting with a contact region of a circuit board, wherein the cell bodies of said cells being positioned parallel to each other, and wherein the end faces of said cell bodies, the connector end and the trailing end being located in a same plane; and
   a circuit board which is positioned parallel to a longitudinal extension of the cell bodies.

2. A battery pack as defined in claim 1, wherein each of the cell connectors guides a positive pole of a cell and a negative pole of an adjacent cell to said contact region.

3. A battery pack as defined in claim 1, wherein said cells are packed tightly together.

4. A battery pack as defined in claim 1; and further comprising a battery bed, said cells being embedded in said battery bed.

5. A battery pack as defined in claim 4; and further comprising a circuit board; a temperature sensor on said circuit board, said battery bed being thermally connected to said temperature sensor.

6. A battery pack as defined in claim 1; and further comprising a circuit board which includes compensation electronics for a symmetrization of a state of charge of said cells.

7. A battery pack as defined in claim 1; and further comprising a circuit board with electronics for monitoring a voltage of said cells.

8. A battery pack as defined in claim 1; and further comprising a circuit board including compensation electronics for a symmetrization of a cell state of said cells, and a circuit for charging said cells with an external mains voltage.

9. A battery pack as defined in claim 1; and further comprising a battery bed including an element selected from the group consisting of a metallic body with good thermal conductivity, a plastic mass with good thermal conductivity, a plastic mass filled with metallic particles, and a material filled with metallic particles.

10. A battery pack as defined in claim 1; and further comprising a battery bed embedded in a material that has a phase transition below a maximum permissible working temperature, with a latent heat of which a temperature of the battery pack is holdable constant for a certain period of time.

11. A battery pack as defined in claim 1, wherein the electrochemical cells are configured as lithium ion cells.

12. A battery pack as defined in claim 1, wherein said connector end and said trailing end are integrally configured as one piece.

13. A battery pack as power tool as defined in claim 1, wherein said cell connectors comprise sheet metal and are derived from punched grids.

\* \* \* \* \*